US012651019B1

(12) United States Patent
Gupta et al.

(10) Patent No.: US 12,651,019 B1
(45) Date of Patent: Jun. 9, 2026

(54) SEMANTIC IMAGE SIMILARITY

(71) Applicant: Microsoft Technology Licensing, LLC, Redmond, WA (US)

(72) Inventors: Manish Gupta, Hyderabad (IN); Niraj Nrisinvha Bhilegaonkar, Hyderabad (IN); Avishek Mazumder, Hyderabad (IN); Akash Katare, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/970,647

(22) Filed: Dec. 5, 2024

(51) Int. Cl.
*G06F 16/535* (2019.01)
*G06F 16/51* (2019.01)

(52) U.S. Cl.
CPC ............ *G06F 16/535* (2019.01); *G06F 16/51* (2019.01)

(58) Field of Classification Search
CPC ............................................. G06F 16/51–535
See application file for complete search history.

(56) References Cited

U.S. PATENT DOCUMENTS

| 2017/0262479 A1* | 9/2017 | Chester | .................. | G06F 16/54 |
| 2020/0019565 A1* | 1/2020 | Ensing | .................. | G06V 20/52 |
| 2021/0216913 A1* | 7/2021 | Zhang | .................. | G06F 18/214 |

* cited by examiner

*Primary Examiner* — Robert W Beausoliel, Jr.
*Assistant Examiner* — Nirav K Khakhar
(74) *Attorney, Agent, or Firm* — Shook, Hardy & Bacon L.L.P.

(57) ABSTRACT

In various examples, an image search is performed based on a query image where the result includes images with semantic information that matches the query image. For example, image encoders are used to extract information from images that are stored in an index. Continuing this example, when a query is obtained the index is searched to determine potential matches, and a comparison is performed between the query image and the potential matches to determine images with semantic information matching the query image.

20 Claims, 12 Drawing Sheets

700

SEMANTIC IMAGE SIMILARITY

BACKGROUND

Various types of artificial intelligence (AI) models can be trained to perform various tasks. For example, generative artificial intelligence (AI) systems may receive, as an input, a text query or prompt, and generate, as an output, a response to that prompt. Moreover, there can be a wide variety of different types of generative AI systems that perform different kinds of generative functions. Such systems may be conversational (or chat) systems, image-generation systems, question-answering systems, or any of a wide variety of other generative AI systems. In such systems, there may be multiple different AI models employed to perform the different generative AI functions.

One type of generative AI model is a language model, and one such type of language model is a large language model (LLM), which is a language model that includes a large number of parameters (often in the tens of billions or hundreds of billions of parameters). In operation an LLM receives a prompt as input, generates tokens based on the prompt, and generates an output or response. The prompt may include data and instructions to generate a particular output. For instance, a generative AI model may be provided with a prompt that includes an instruction (such as to generate a particular type of output—for instance, summarize a document, or respond to a question, etc.), along with examples of that type of output and/or any additional context information.

SUMMARY

Embodiments described herein are directed to determining semantic similarities between images and videos. Advantageously, in various embodiments, the systems and methods described are directed towards identifying images and videos that solve the same problem and/or have the same meaning as a reference image. In particular, an image search system is provided that uses machine learning models to determine if two or more images have the same semantic meaning. For example, an image including a geometry problem is provided to a machine learning model (for example, a Siamese network, triplet network, object detection model, image encoder, or other appropriate model) and an index is searched to determine a match to the image and the geometry problem. Continuing this example, the index is generated using the machine learning model based on a plurality of images. In various embodiments, the index includes embeddings, geometric markup, or other representations of the plurality of images generated by a machine learning model that can be searched to find images with the same or similar semantic meaning.

BRIEF DESCRIPTION OF THE DRAWINGS

The present disclosure is described in detail below with reference to the attached drawing figures, wherein.

DETAILED DESCRIPTION

Figure 1:
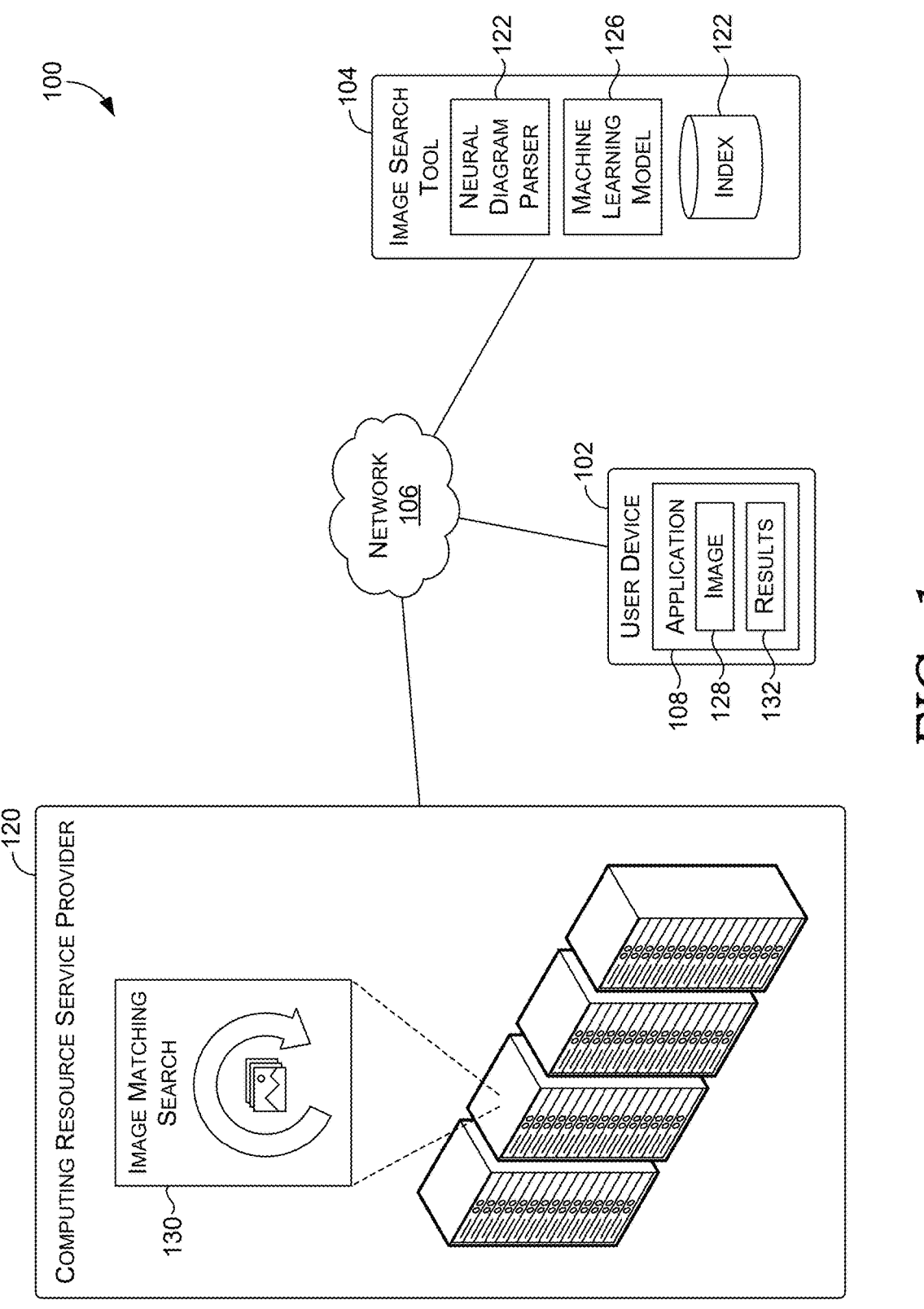
FIG. 1 depicts an environment in which one or more embodiments of the present disclosure can be practiced.

In modern search systems, users are able to provide input images, as opposed to or in addition to natural language queries, and obtain search results based on the input. For example, cloud computing services provide image search capabilities that allow users to search the Internet for similar images. This provides users with new search tools that may present the user with more relevant and/or useful information. For example, users are able to find similar images more efficiently than using natural language search systems. Because images can convey information quicker, can convey more information than an equivalent amount of text, and can convey information that may be difficult to describe using natural language, image searching can improve a user's ability to find relevant information; however, these search capabilities are limited because there are aspects of images such as color, brightness, etc., that contribute to image similarity but that are not relevant to the user's search query. For example, conventional search tools when searching geometry diagram, mathematical formulas, architectural and/or structural drawings, or other images that contain high-level semantic information often provide results that are not relevant to the query image but that include similar image characteristics such as color, brightness, background, shape, saturation, etc. This results in search results from conventional systems that are merely approximate matches, and causing dissatisfaction for users.

In contrast, embodiments described herein generally relate to search systems and/or question-answering systems that extract semantic information from images and videos in order to provide relevant and improved results and/or information in response to a query. In accordance with some aspects, the systems and methods described are directed to a machine learning model that extracts semantic information from images and identifies images with similar and/or matching semantic information. In various embodiments, the machine learning model is trained using supervised learning techniques to determine whether two or more images contain similar semantic information. For example, a Siamese network or triplet network is trained to determine if two or more geometry diagrams represent the same geometry problem and/or solution.

In other embodiments, an image encoder is used to extract semantic information from images. For example, a neural diagram parser is used to parse a geometry diagram into data that is used to generate a geometric markup representing geometric primitives, relationships, and/or predicates illustrated in the geometry diagram. In various embodiments, the data extracted or otherwise generated by the machine learning model is stored in an index, which is searched in response to queries. In one example, the index includes embeddings (e.g., vectors) and/or geometric markup representing a plurality of images. Continuing this example, when a query image is received, the query image is provided as an input to the machine learning model, and the index is searched to determine a potential match to the semantic information included in the query image.

Aspects of the technology described herein provide a number of improvements over existing technologies. For instance, the image search tool provides users with results that include relevant semantic information, such as information responsive to users' intents when performing the search operations. In one particular example, the search results include instructions for solving a geometry problem represented in a search query. In another example, the search tool can provide feedback on diagrams generated by a user by comparing the diagrams to a correct representation. In particular, the feedback can include assistance to a student learning to solve a problem and/or assistance to a teacher in correcting student work. In yet other examples, the search tool is used to compare architectural diagrams and/or blueprints (e.g., computer-aided design drawings).

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory, as further described with reference to FIG. 12.

It should be understood that operating environment 100 shown in FIG. 1 is an example of one suitable operating environment. Among other components not shown, operating environment 100 includes a user device 102, an image search tool 104, a computing resource service provider 120, and a network 106. Each of the components shown in FIG. 1 can be implemented via any type of computing device, such as one or more computing devices 1200 described in connection with FIG. 12, for example. These components can communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the image search tool 104 includes multiple server computer systems cooperating in a distributed environment to perform the operations described in the present disclosure. In various embodiments, the image search tool 104 is a service and/or component of a service of the computing resource service provider 120. For example, the image search tool 104 a is a service of the computing resource service provider 120 that performs image-matching searches 130 using an image 128 provided by the user device 102 through the application 108.

The user device 102 can be any type of computing device capable of being operated by an entity (e.g., individual or organization) and obtains data from image search tool 104 and/or the image match search 130, which can be facilitated by the image search tool 104 (e.g., a server operating as a frontend). The user device 102, in various embodiments, has access to or otherwise provides the image 128 to the image search tool, which is used to identify one or more images based on an index 122 that represents or otherwise includes the same semantic meaning. For example, the application 108 includes a web browser or other application capable of interacting with the computing resource service provider 120 and/or the image search tool 104.

In some implementations, user device 102 is the type of computing device described in connection with FIG. 12. By way of example and not limitation, the user device 102 can be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media can also include computer-readable instructions executable by the one or more processors. In an embodiment, the instructions are embodied by one or more applications, such as application 108 shown in FIG. 1. Application 108 is referred to as a single application for simplicity, but its functionality can be embodied by one or more applications in practice.

In various embodiments, the application 108 includes any application capable of facilitating the exchange of information between the user device 102 and the image search tool 104. For example, the application 108 provides the user with a user interface to input the image 128 (e.g., a query). In some examples, the user provides the image 128 and a natural language query or other information to further refine the search. In some implementations, the application 108 comprises a web application, which can run in a web browser, and can be hosted at least partially on the server-side of the operating environment 100. In addition, or instead, the application 108 can comprise a dedicated application, such as an application being supported by the user device 102 and image search tool 104. In some cases, the application 108 is integrated into the operating system (e.g., as a service). It is therefore contemplated herein that "application" be interpreted broadly.

For cloud-based implementations, for example, the application 108 is utilized to interface with the functionality implemented by the image search tool 104. In some embodiments, the components, or portions thereof, of the image search tool 104 are implemented on the user device 102 or other systems or devices. Thus, it should be appreciated that the image search tool 104, in some embodiments, is provided via multiple devices arranged in a distributed environment that collectively provide the functionality described herein. Additionally, other components not shown can also be included within the distributed environment.

As illustrated in FIG. 1, in an embodiment, the image search tool 104 includes a neural diagram parser 124, a machine learning model 126, and an index 122. In various embodiments, the machine learning model 126 includes a neural network trained to extract semantic meaning from an image by at least generating a vector representation of the image 128. For example, the machine learning model 126 includes a neural network (e.g., Siamese network, triplet network, etc.) trained using supervised learning techniques to generate embeddings based on an input image, such as the image 128. In various embodiments, the embeddings and/or other information extracted from the input image is stored in the index 122. For example, the index 122 includes a data structure that can be searched to determine a result 132. In various embodiments, the result 132 indicates images that match or otherwise include similar semantic information as the image 128.

In various embodiments, supervised training of the machine learning model 126 includes obtaining a labeled dataset indicating matching pairs of images and non-matching pairs. For example, the labeled dataset set includes a curated set of human-labeled data. In an embodiment, the labeled dataset is used to train a Siamese network to output whether two images are similar. In one example, the labeled dataset is generated using a tool or other application that generates geometry diagram. Continuing this example, such tools synthetically generate geometry diagrams by introducing random but fixed geometric data. Furthermore, in various embodiments, negative pairs are generated by linking the image 128 with another randomly chosen image.

In an embodiment, the machine learning model 126 includes a convolutional neural network that is trained on the labeled dataset using Siamese loss or triplet loss. For example, when triplet loss is used to train the machine learning model 126, the labelled dataset includes preference data. For example, preference data includes three images (e.g., diagram, blueprints, drawings, etc.) and, given an anchor image, the annotator indicates which of the images is more closely related or similar to the anchor image. In one example, the annotator indicates, based on an anchor image "A," which of image "B" or image "C" is most similar to the anchor image "A."

In various embodiments, the image 128 includes various types of images that include semantic meaning such as geometry diagrams, blueprints, mathematical equations, computer aided drawings, or other visual information. For example, the image 128 includes a geometry diagram such as the image depicted in FIG. 5. Furthermore, the results 132, in various embodiments, include a ranking or other display of images that include similar semantic meaning as the image 128. In one example, the results 132 include instructions or other information suitable for solving a problem displayed in the image 128.

In various embodiments, the image search tool 104 includes the neural diagram parser 124, which is used to parse the image 128 into a markup language that indicates the semantic information and/or relationships depicted in the image 128. In one example, the neural diagram parser 124 extracts geometric information from the image 128 and stores the extracted geometric information in a structured data format (e.g., a markup language). Continuing this example, the structured data formation includes basic geometric primitives and relationships between primitives. In various embodiments, the geometric primitives include points, circles, lines, or other components of geometric diagrams. Furthermore, the structured data, in an embodiment, also includes predicate information extracted from the image 128. For example, the predicate information includes the length of a line segment or the angle between two or more points. In yet other embodiments, the structured data also includes relationship data. For example, the line "AB" intersects the center "C."

In various embodiments, the neural diagram parser 124 creates relation sets and predicates involving various geometric primitives like points, lines, circles, triangles, etc. In one example, the neural diagram parser 124 uses object detection methods such as a RetinaNet model, which extracts both primitives and relationships such as inside, outside, on, parallel, within, etc. to generate the structured data, which is stored in the index 122, and searched to identify matching images based on the image 128 and generate the results 132. Furthermore, in various embodiments, text and symbols (e.g., mathematical symbols and corresponding text to geometric primitives) in the image 128 are assigned based on a set of rules or heuristics. For example, the text label "A" representing a point in the image 128 is assigned to the nearest primitive.

In various embodiments, the index 122 is searched using an approximate nearest neighbor (ANN) search algorithm or other search algorithm suitable for comparing structured data and/or vector representations of images. For example, the index 122 is generated based on a corpus of images (e.g., images obtained from the Internet) by at least providing the images as an input to the machine learning model 126 and/or neural diagram parser 124. Continuing this example, in response to the image search tool 104 obtaining a query from the application 108 (e.g., the image 128), the image 128 is provided as an input to the machine learning model 126 and/or neural diagram parser 124, and the output is used to search the index 122 to generate the results 132. Furthermore, in various embodiments, a second machine learning model (not illustrated in FIG. 1 for simplicity) is used to generate the results 132. For example, a large language model (LLM) is used to generate the results 132 and generate additional information such as instructions for solving the problem illustrated in the image 128.

In an embodiment, given the structured data (e.g., structured data indicating primitives and relationships) for the image 128, a deductive and/or symbolic reasoning logic method is used to determine whether the index 122 includes a second structured data set that is equivalent or similar to the structured data associated with the image 128. For example, fuzzy logic methods are used to establish equivalence between images (e.g., the structured data representation of the images), even if the images differ but the semantic meaning is the same or similar. Continuing this example, the fuzzy logic method determines that images are the same even if the labels for the primitives are different.

In various embodiments, the similarity between the structured data representing the image 128 and the structured data included in the index is determined using a machine learning model such as an LLM. For example, the LLM includes pre-trained model and/or could be fine-tuned on labeled data of positive pairs and negative pairs, as described above. In various embodiments, the matching and/or similar images indicated in the index 122 are filters prior to providing or otherwise generating the results 132. For example, a question depicted in the image 128 (e.g., text extracted with the image 128) is used to filter the index 122 and narrow or otherwise reduce the search space. In another example, metadata associated with the image 128 (e.g., category, type, description, or other metadata associated with the image) is used to filter the index 122. Continuing this example, metadata associated with the image 128 indicates that the image 128 is a blueprint for a building, and the index 122 is then filtered to search only blueprints for buildings. Alternatively, in various embodiments, the filters described are applied after the index 122 is searched.

In various embodiments, the image 128 is extracted from a video, and the image search tool 104 compares videos to determine similarity. For example, key frames of a video are extracted and used as images described in the present disclosure. In other examples, frames of the video are sampled at a particular rate (one fame a minute) and used to generate the index 122. Furthermore, a transcript of the video, in various embodiments, is extracted and used to filter results or otherwise determine similarity between videos.

Although examples are described herein with respect to using neural networks and specifically convolutional neural networks (CNNs), as the machine learning model 126, (e.g., Siamese network or triplet network), this is not intended to be limiting. For example, and without limitation, the machine learning model(s) of the present disclosure may include any type of machine learning model(s), such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), computer vision algorithms, and/or other types of machine learning models.

In various embodiments, the machine learning models include image encoders that generate embeddings based on input data in vector space, which is then stored in an index 122 during initialization and/or training and used as a query to search the index 122 during operation. Continuing this example, during operation, the index 122 is searched (e.g., using an approximate nearest neighbor [ANN] search or another search algorithm) based on embeddings generated by the machine learning model 126. In an embodiment, the machine learning models include image encoders that parse the images and generate geometric markup representing primitives, relationships, and other semantic data depicted in the images. Similarly, in some examples, the geometric markup is stored in the index 122 and searched (e.g., using fuzzy logic, ANN, or an LLM) to identifying matching images.

Figures 2A, 2B:
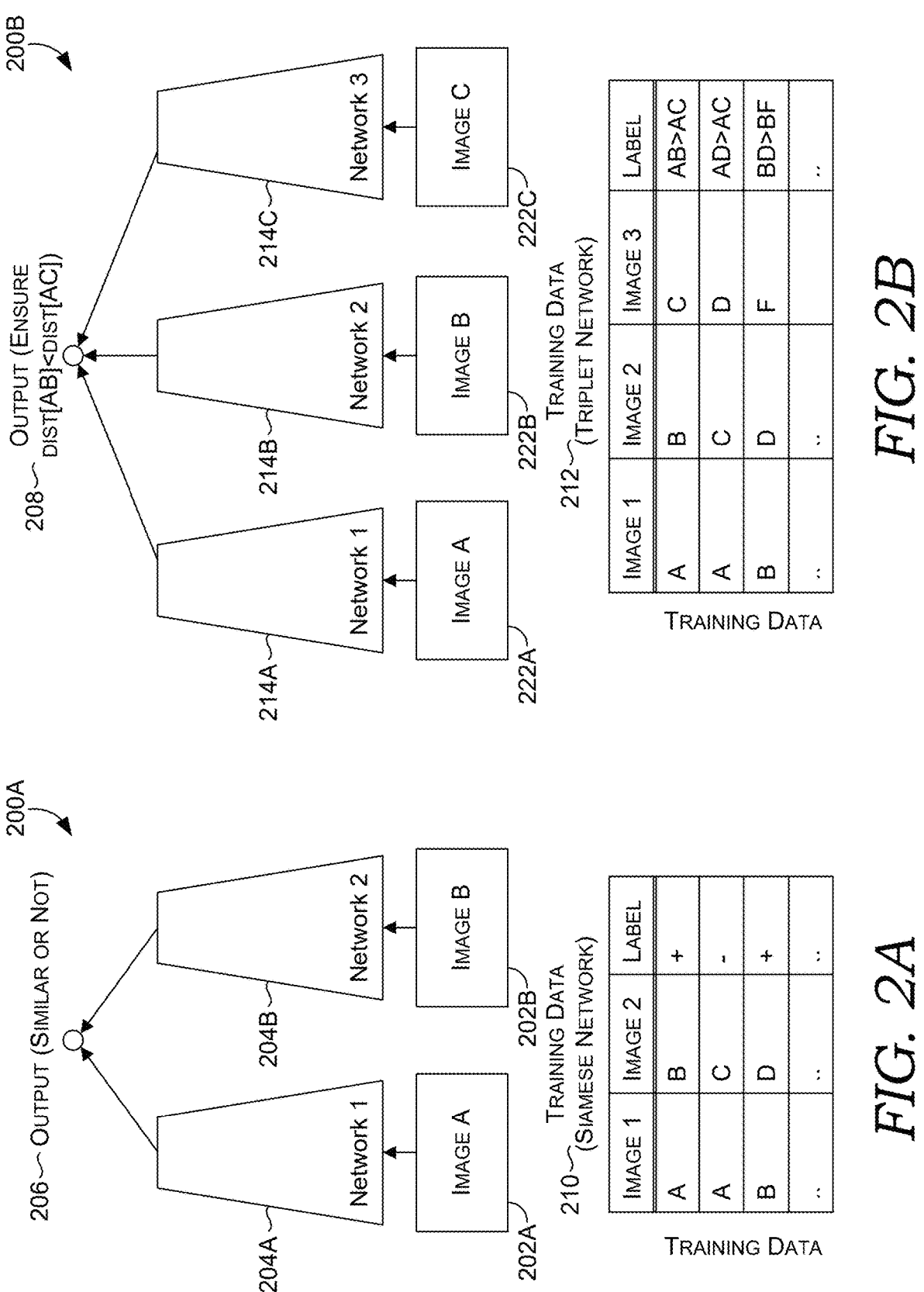
FIG. 2A depicts an environment in which a Siamese network is used to determine images with semantic meaning matching a query image, in accordance with at least one embodiment.
FIG. 2B depicts an environment in which a triplet network is used to determine images with semantic meaning matching a query image, in accordance with at least one embodiment.

FIG. 2A provides a block diagram illustrating an environment 200A for training a Siamese neural network to generate embeddings based on a set of input images in accordance with some aspects, which could be performed, for instance, by the search tool 120 or component thereof such as the machine learning model 126 described above in connection with FIG. 1. As shown in FIG. 2A, the Siamese neural network includes two networks, a first network 204A and a second network 204B. In various embodiments, the two networks 204A and 204B share the same weights and process input images 202A and 202B to generate an output 206 (e.g., embeddings in vector space) to determine whether the images are similar.

In various embodiments, the first network 202A and the second network 202B are Siamese neural networks trained using the training data 210. For example, the Siamese neural networks (e.g., the first network 202A and the second network 202B) include two or more identical networks/subnetworks that share the same weights and architecture and operate in tandem on separate inputs. Continuing this example, in the case of contrastive loss for a positive sample (e.g., images labeled as containing the same semantic meaning in the training data 210), the Siamese neural network comprises two identical networks where the first network 204A receives as input the image 202A and outputs an embedding for the image 202A, and the second network 204B receives the image 202B (which has the same semantic meaning as image 202A) and outputs an embedding for the second image 202B. During training, the weights of each network of the Siamese neural network are similarly updated based on the loss computed. In other words, the updated weights at each iteration are the same across the networks.

In various embodiments, the training data 210 includes human-labeled data that indicates whether two images (e.g., image "A" and image "B") contain the same semantic information. For example, a positive label (illustrated in FIG. 2A with a "+") indicates that the two images contain the same geometric problem, math problem, blueprints, or otherwise share the same information. Alternatively, in one example, a negative label (illustrated in FIG. 2A with a "−") indicates that the two images do not contain the same information.

FIG. 2B provides a block diagram illustrating an environment 200B for training a triplet neural network (e.g., using a triplet loss) to generate embeddings based on a set of input images in accordance with some aspects, which could be performed, for instance, by the search tool 120 or component thereof such as the machine learning model 126 described above in connection with FIG. 1. FIG. 2 is provided as an example of triplet loss for illustration purposes only. As discussed above, other types of losses, such as contrastive loss and quadruplet loss, can be used in accordance with different aspects of the technology described herein.

As shown in FIG. 2B, the triple neural network includes three networks: a first network 214A, a second network 214B, and a third network 214C that share the same weights. For example, the triplet neural networks (e.g., the first network 214A, the second network 214B, and the third network 214C) include three or more identical networks/ subnetworks that share the same weights and architecture and operate in tandem on separate inputs. Continuing this example, in the case of triplet loss for a positive sample (e.g., images labeled as containing the same semantic meaning in the training data 212), the triplet neural network comprises three identical networks where the first network 214A receives as input the image 222A and outputs an embedding for the image 222A, the second network 214B receives the image 222B and outputs an embedding for the second image 222B, and the third network 214C receives the image 222C and outputs an embedding for the second image 222C. In various embodiments, the output 208 of the triplet network indicates which images of the set of input images are the most similar. For example, the triplet model is trained to output whether image "A" is more similar to image "B" or image "C." During training, the weights of each network of the triplet neural network are similarly updated based on the loss computed. In other words, the updated weights at each iteration are the same across the networks.

In various embodiments, the training data 212 includes human-labeled data that indicates whether one image (e.g., image "A") is more similar to one of two or more other images (e.g., image "B" or image "C"). In the example illustrated in FIG. 2B, image "A" and image "B" are more similar than image "A" and image "C." In some embodiments, the training 212 is more accurate because it is easier for humans to label images as more similar relative to other images as opposed to indicating whether two images contain matching semantic meaning.

Figures 3A, 3B:
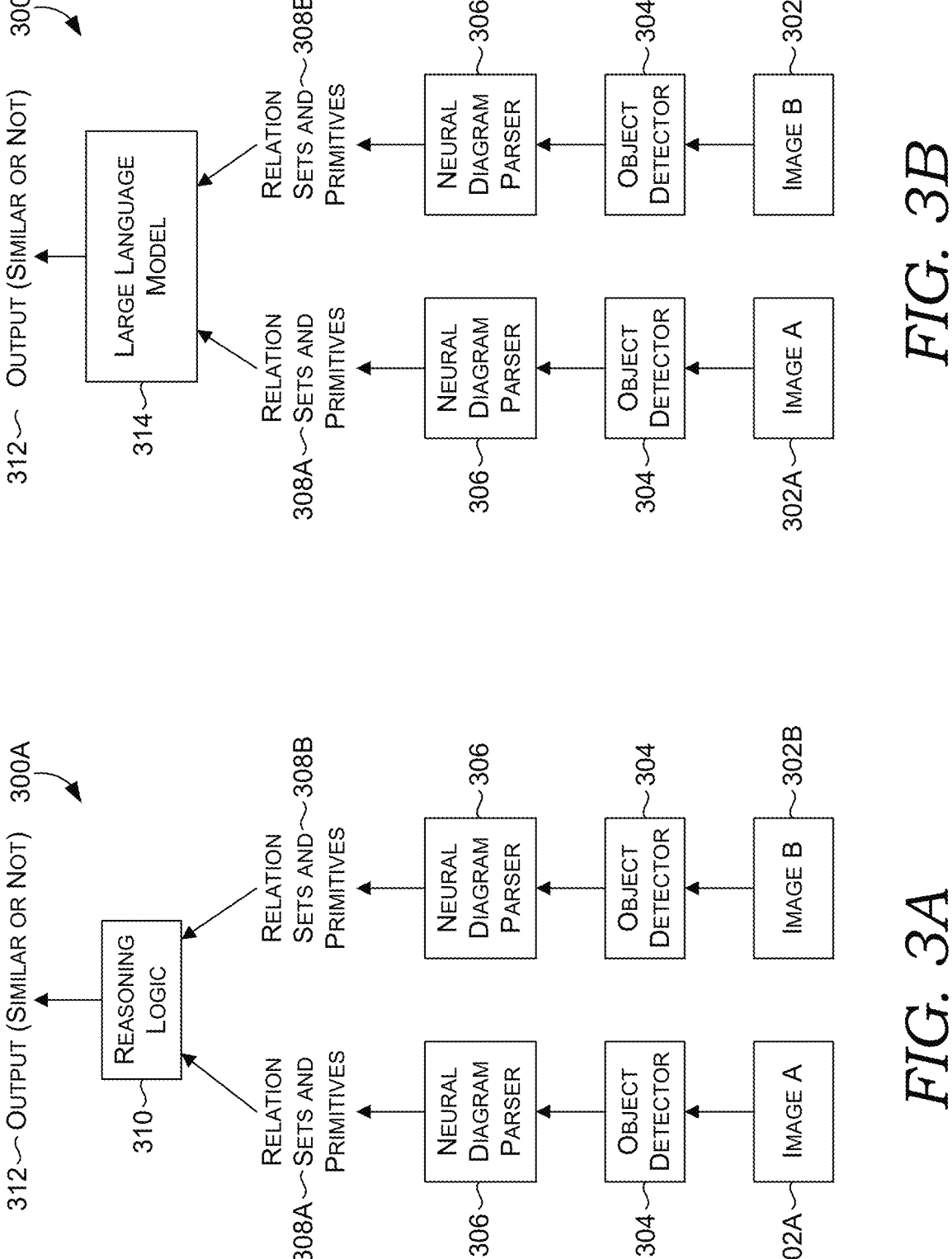
FIGS. 3A and 3B depict environments in which geometric markup is generated and used to determine images with semantic meaning matching a query image, in accordance with at least one embodiment.

FIGS. 3A and 3B illustrate environments 300A and 300B in which a search tool determines whether two images contain matching semantic meaning in accordance with an embodiment. In various embodiments, two images (e.g., image "A" 302A and image "B" 302B) are provided to an object detector 304, which generates embeddings or other data that is provided to a neural diagram parser 306 to generate relation sets and primitives 308A and 308B. In some aspects, the object detector 304 and neural diagram parser 306 include image encoders, as described above. For example, the object detector 304 includes a Siamese neural network, triplet neural network, or another network trained to output whether two or more images contain or otherwise depict the same semantic information.

In various embodiments, the neural diagram parser 306 is a trained machine learning model that generates the relation sets and primitives 308A and 308B based on the output of the object detector 304 and/or the images (e.g., image "A" 302A and image "B" 302B). The neural diagram parser 306, for example, includes single-stage detectors such as single-shot multibox detectors, two-stage detectors such as region-based convolutional neural networks, or transformer-based models such as detection transformers. Furthermore, as described below, the output of the neural diagram parser 306 includes the relation sets and primitives 308A and 308B, as well as bounding box information, class labels, and confidence scores.

In various embodiments, the environments 300A and 300B include the same components; however, environment 300A uses reasoning logic 310 to generate the output 312 indicating whether the images (e.g., image "A" 302A and image "B" 302B) contain the same semantic information, and environment 300B uses an LLM 314 to generate the output 312 indicating whether the images (e.g., image "A" 302A and image "B" 302B) contain the same semantic information. Furthermore, in various embodiments, the relation sets and primitives 308B are obtained from an index such as the index 122 described above in connection with FIG. 1. For example, the image "B" 302B is processed to generate the relation sets and primitives 308B prior to image "A" 302A, and the relation sets and primitives 308B are then stored in the index and can be retrieved and compared to the relation sets and primitives 308A during a search operation.

In various embodiments, the relation sets and primitives 308A and 308B include geometric markup data, as described above. For example, the relation sets and primitives 308A and 308B include a structured data object containing data associated with an image such as primitives (e.g., Point "E," Circle "Z," Line "AE," Dotted Line "AD," etc.), predicates (e.g., AC=3, Angle (ABC)=90, length AD=4, etc.), and relation sets (e.g., isCenter [A,Z], isOn[B,Z], online[A,B], Intersect[A], etc.). In various embodiments, the relation sets and primitives 308A and 308B include semantic meaning extracted from an image and encoded in a data object and/or data structure. In other examples where the image includes a diagram and/or blueprint, the relation sets and primitives 308A and 308B includes data such as nodes, connections, segments, layers, redundancies, failovers, management, monitoring, elevations, topography, sections, details, layout, boundaries, schedule, scale, dimensions, or any other data that provides context and/or meaning within the image.

Turning to FIG. 3A, in various embodiments, the reasoning logic 310 includes various types of logic and/or algorithms that determine and/or detect similarity between the relation sets and primitives 308A and 308B. For example, the reasoning logic 310 includes deceptive and/or symbolic reasoning to establish equality (e.g., similarity) between the image "A" 302A and the image "B" 302B. In various embodiments, the reasoning logic 310 and/or LLM determine approximate matches between the image "A" 302A and the image "B" 302B (e.g., based on the relation sets and primitives 308A and 308B). In one example, a solid line is determined to be equivalent to a dotted line and, as a result, an approximate match is determined between two images.

In an embodiment, the reasoning logic 310 includes executable instructions or other source code to implement a fuzzy logic algorithm to determine whether the image "A" 302A and the image "B" 302B are equivalent (e.g., members of the same class). In one example, the relation sets and primitives 308A and 308B are provided as input to a membership function (e.g., fuzzification) which converts the input to a fuzzy output. Continuing this example, the fuzzy output is then processed by an inference engine based on a set of fuzzy rules, and the output is converted back to geometric markup to determine whether the two images match.

Turning to FIG. 3B, in various embodiments, the LLM 314 is trained, pre-trained, fine-tuned, or otherwise modified (e.g., by modifying the weights and parameters of the LLM 314) to detect similarity between the relation sets and primitives 308A and 308B. In one example, the LLM 314 is a model such as the model described below in connection with FIG. 11. In various embodiments, the LLM 314 is trained based on the index and/or training data described above. In one example, the LLM 314 is fine-tuned based on the relation sets and primitives included in the index and labeled training data that indicates whether two or more images contain the same semantic information.

The LLM 314, in various embodiments, is or includes any number of machine learning models or technologies. In some embodiments, the LLM 314 that takes, as input, the relation sets and primitives 308A and 308B and a prompt, then provides, as output, an indication of whether the images corresponding to the relation sets and primitives 308A and 308B are similar. As described in greater detail below in connection with FIG. 11, a language model is a statistical and probabilistic tool that determines the probability of a given sequence of words (e.g., via next sentence prediction [NSP] or masked language modeling [MLM]). In this way, it is a tool that is trained to predict the next word in a sequence. A language model is called a large language model when it is trained on an enormous amount of data. Some examples of LLMs are Open Pre-trained Transformer (OPT), Fine-tuned Language Net—Text-to-Text Transfer Transformer (FLAN-T5), Bidirectional and Auto-Regressive Transformers (BART), Bidirectional Encoder Representations from Transformers (BERT), and Generative Pre-trained Transformer (GPT), GPT-3, and GPT-4. For instance, GPT-3 is a large language model with 175 billion parameters trained on 570 gigabytes of text. These models have capabilities ranging from writing a simple essay to generating complex computer codes-all with limited to no supervision. Accordingly, an LLM is a deep neural network that is very large (billions to hundreds of billions of parameters) and understands, processes, and produces human natural language by being trained on massive amounts of text.

In embodiments, the LLM 314 is fine-tuned. Fine-tuning generally refers to the process of retraining a pre-trained model on a new dataset without training from scratch. Fine-tuning typically takes weights of a trained model and uses those weights as the initialization value, which is then adjusted during fine-tuning based on the new dataset. Fine-tuning can be used in cases in which an industry-specific data set exists that can be used to fine-tune the model. In some implementations, the LLM is fine-tuned on various types of geometric markup and/or relation sets and primitives to leverage its text-generation ability in association with image descriptions and semantic meaning included in images.

Figure 4:
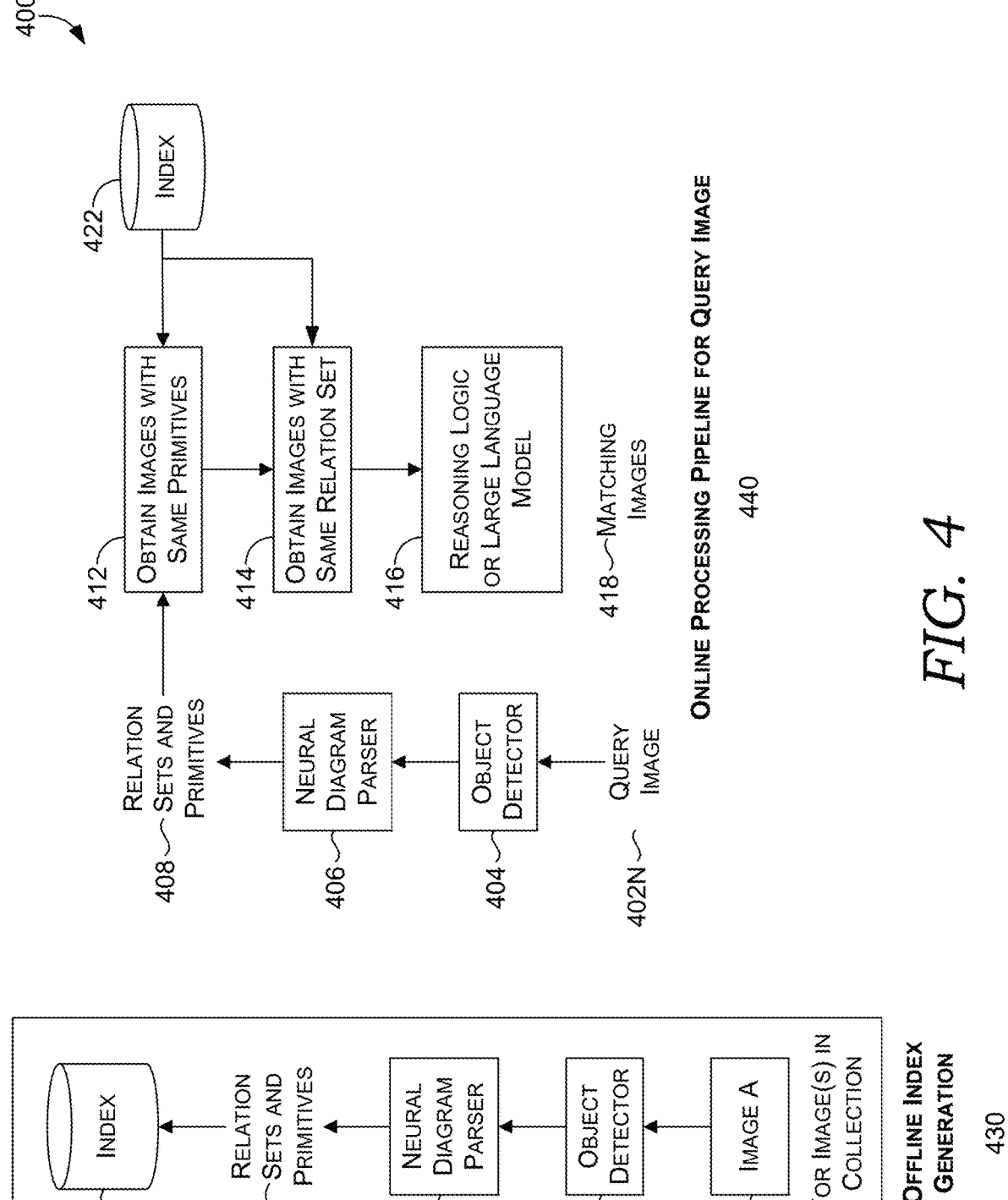
FIG. 4 depicts an environment in which an index is generated and used to identify images with matching semantic meaning, in accordance with at least one embodiment.

FIG. 4 depicts an environment 400 in which an index 422 is generated and used to identify matching images 418 with similar semantic meaning, in accordance with at least one embodiment. As illustrated in FIG. 4, the environment 400 includes an "offline" 430 component to generate the index 422 and an "online" component 440 to detected matching images 418. In various embodiments, the "offline" 430 component includes training machine learning models (e.g., an object detector 404 and a neural diagram parser 406), generating training data, collecting data, labeling data, and other operations to generate the index 422. In various embodiments, the image 402A includes any image that depicts or otherwise contains semantic meaning and/or information such as the images described above. Furthermore, in various embodiments, the object detector 404 and the neural diagram parser 406 include machine learning models and/or image encoders as described above.

In an embodiment, for a set of images included in the collection (e.g., a set of images extracted from a source such as the Internet, repository, or other location), the object detector 404 performs inferencing on the image(s) in the set of images and extracts (e.g., generates as an output) geometric primitives, such as using the geometric markup to indicate primitives including points, lines, or other components of the image(s). For example, the object detector 404 generates a bounding box and a label for a point "AB" depicted in an image "A" 402A.

Furthermore, in various embodiments, the neural diagram parser 406 extracts relation sets between the primitives extracted by the object detector 404. For example, the image "A" 402A and the primitives extracted from the image "A" 402 by the object detector 404 are provided to the neural diagram parser 406 as an input and the relation sets between the primitives are output by the neural diagram parser 406. In various embodiments, the image(s) in the collection are processed to generate the relation sets and primitives 408 which are then stored in the index 422.

In various embodiments, the index 422 is maintained by at least obtaining additional images, generating corresponding relation sets and primitives, and updating the index 422 with the corresponding relation sets and primitives. Furthermore, as new query images (e.g., a query image 402N) are obtained, for example during "online" 440 processing, the relation sets and primitives corresponding to the new query images are stored in the index 422. Turning to "online" 440 processing, in an embodiment, query images are obtained (e.g., through a user interface of an application), the object detector 404 and neural diagram parser 406 extract relation sets and primitives corresponding to the query image 402N. For example, a user submits the query image 402N through a web browser or similar application.

In an embodiment, the index 422 is searched to obtain images with the same or similar primitive set 412. For example, the index 422 is searched to identify images with the same number, name, and/or type of primitive. Continuing this example, from this selected, identified, or otherwise obtained set of images, a filtered subset is obtained or otherwise generated based on the relation sets 414 that match the relation set corresponding to the query image 402N. In various embodiments, filtering the index 422 in this manner reduces the number of comparisons needed to determine matching images 418 and increases efficiency. In various embodiments, the index is not filtered or other filtering techniques are used.

In various embodiments, reasoning logic and/or an LLM 416 are used to determine if the index 422 includes matching images 418 (e.g., the result returned to the user). As described above in connection with FIGS. 3A and 3B, matching images 418 are determined by at least using the reasoning logic and/or an LLM 416 to compare the relation sets and primitives 408 of the images from the index 422 (e.g., the filter set of images) and the query images 420N. In various embodiments, the reasoning logic and the LLM are used together, and a match is determined based on a consensus between the reasoning logic and the LLM.

In addition, other operations not shown in FIG. 4 for simplicity, in various embodiments, are performed to determine the matching images 418. For example, given two matching geometry images (e.g., images that have the same or similar relation sets and primitives), the questions asked can be different. Therefore, in various embodiments, given two geometry images as described above, where the image similarity has been established, the "online" 440 processing includes an operation to determine that the text question included or otherwise associated with the images is also similar. For example, the text question similarity could be established using several text similarity methods including syntactic similarity scores like bilingual evaluation understudy (BLEU) and/or recall-oriented understudy for gisting evaluation (ROUGE), as well as semantic similarity measures like metrics for the evaluation of translation with explicit ordering (METEOR), consensus-based image description evaluation (CIDEr), etc.

In various embodiments, the images (e.g., the images "A" 402A) include frames and/or images extracted from videos. For example, videos explaining the solution to a particular geometry problem include images that are extracted and indexed to provide additional information when matching images 418 are determined. Continuing this example, the video and/or a link to the video is included in a result displayed in a user interface to the user. In various embodiments, videos are sampled and representative image frames are extracted from the videos. For example, geometry-related videos are determined based on a video category classifier or other classification model. Further, continuing this example, the frames of the video (or a subset of frames) are classified as either containing a geometry diagram or not. Finally, in this example, the frames classified as "containing geometry diagram" are processed using the object detector 404 and neural diagram parser 406 (e.g., the "offline" 430 component above), and the extracted relation sets and primitives are stored in the index 422. In various embodiments, the videos are selected based on frequency and/or number of views. Furthermore, in some embodiments, the sampling rate for the videos is reduced to increase efficiency.

Figure 5:
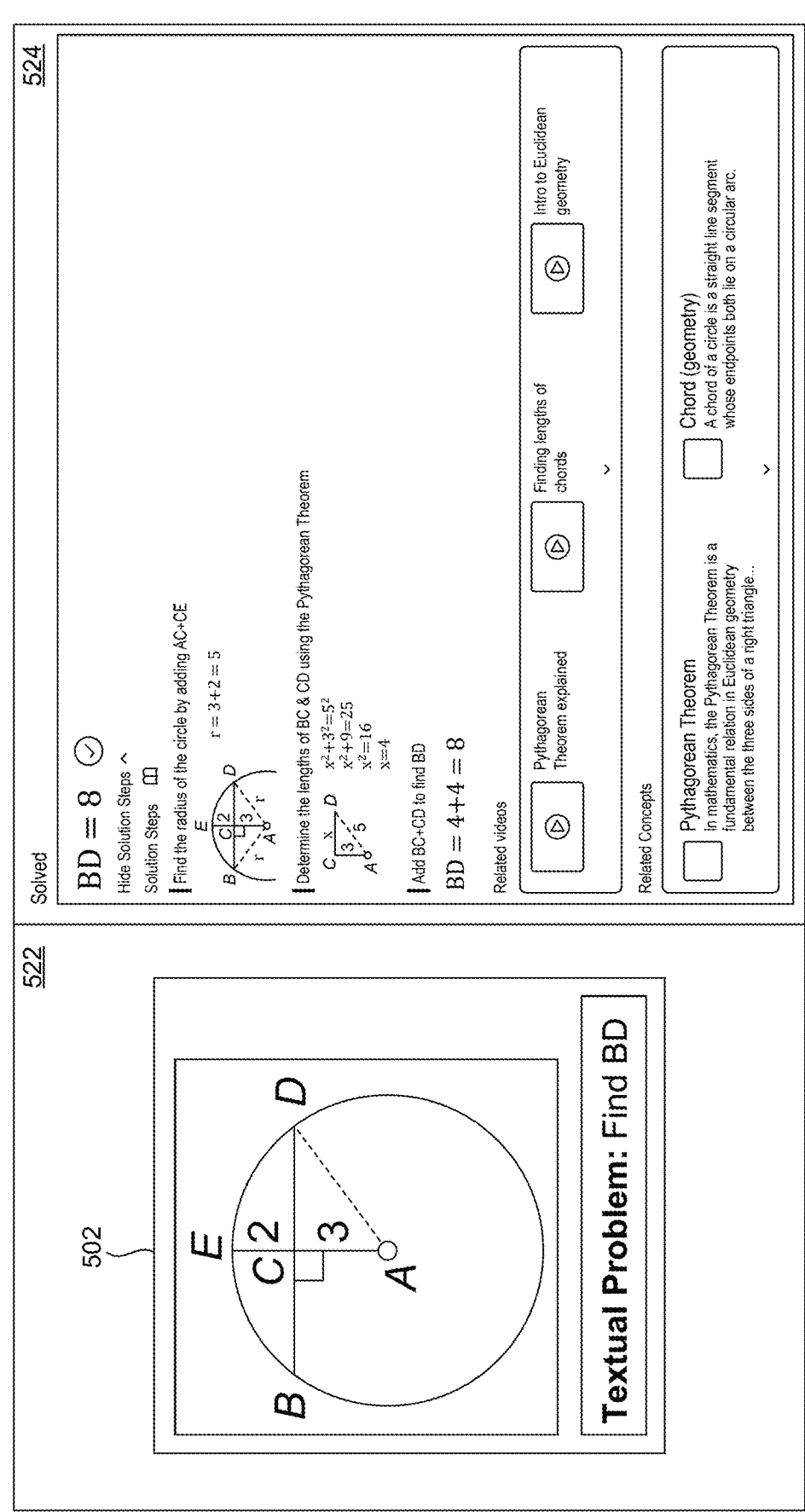
FIG. 5 depicts a user interface in which a query image is used to search for images with semantic meaning matching a query image, in accordance with at least one embodiment.

FIG. 5 depicts a user interface 500 in which a query image is used to search for images with matching semantic meaning, in accordance with at least one embodiment. In various embodiments, the user interface 500 includes various user interface elements such as a query panel 522 and a result panel 524. In various embodiments, additional user interface elements are included in the user interface 500 such as a navigation panel, menu, buttons, side panel, or other user interface elements. In one example, the query panel 522 includes a search bar to add an additional search query (e.g., natural language query) along with the query image 502 displayed in the query panel 502. In another example, the query panel 522 includes a crop button that, as a result of the user interacting with the crop button, allows the user to crop an image to generate the query image 502 from a portion of the image.

In various embodiments, the user provides the query image 502 through the query panel 522. For example, the user can upload the image to the query panel 522 through a user interface element. In another example, the user can select the query image 502 from a set of images displayed in the query panel 522. Once the query image 502 is provided, in an embodiment, an application displaying the user interface causes a computer system and/or service to identify matching images and/or generate a result to be displayed in the result panel 524. For example, the application provides the query image 502 to a search tool, such as the search tool 104 described above in connection with FIG. 1.

In various embodiments, the application obtains the result and causes the result to be displayed in the result panel 524. In the example illustrated in FIG. 5, the result includes a solution for a geometry problem depicted in the query image 502. Furthermore, in various embodiments, the result includes additional information such as related videos and concepts.

Figure 6:
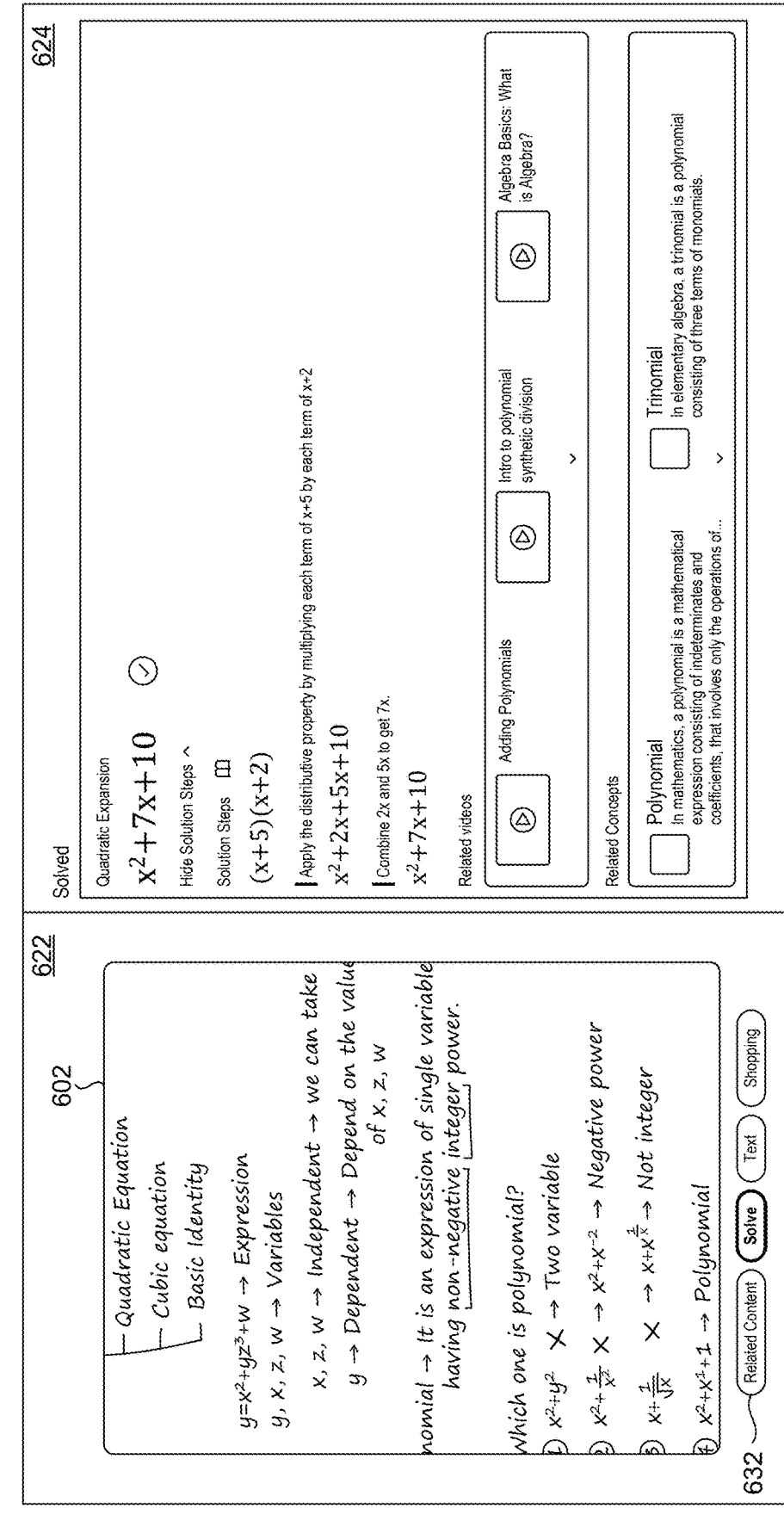
FIG. 6 depicts a user interface in which a query image is used to search for images with semantic meaning matching a query image, in accordance with at least one embodiment.

FIG. 6 depicts a user interface 600 in which a query image 602 is used to search for images with matching semantic meaning, in accordance with at least one embodiment. In various embodiments, the user interface 600 includes various user interface elements such as a query panel 622 and a result panel 624. In various embodiments, additional user interface elements are included in the user interface 600 such as a navigation panel, menu, buttons, side panel, or other user interface elements. In one example, the query panel 522 includes a search bar to add an additional search query (e.g., natural language query) along with the query image 502 displayed in the query panel 502. In another example, the query panel 522 includes a crop button that, as a result of the user interacting with the crop button, allows the user to crop an image to generate the query image 502 from a portion of the image.

Furthermore, in the example illustrated in FIG. 6, the user interface 600 includes various function buttons 632 such as a related content button, a solve button, a text button, and a shopping button. In various embodiments, the function buttons 632 modify the search function performed based on the query image 602. For example, when the "solve" function button is selected a search tool performs a query to obtain a solution to a problem depicted in the query image.

In various embodiments, the user provides the query image 602 through the query panel 622. For example, the user can upload the image to the query panel 622 through a user interface element. In another example, the user can select the query image 602 from a set of images displayed in the query panel 622. Once the query image 602 is provided, in an embodiment, an application displaying the user interface causes a computer system and/or service to identify matching images and/or generate a result to be displayed in the result panel 624. For example, the application provides the query image 602 to the search tool, such as the search tool 104 described above in connection with FIG. 1.

In various embodiments, the application obtains the result and causes the result to be displayed in the result panel 624. In the example illustrated in FIG. 6, the result includes a solution for a geometry problem depicted in the query image 602. Furthermore, in various embodiments, the result includes additional information such as related videos and concepts.

Figure 7:
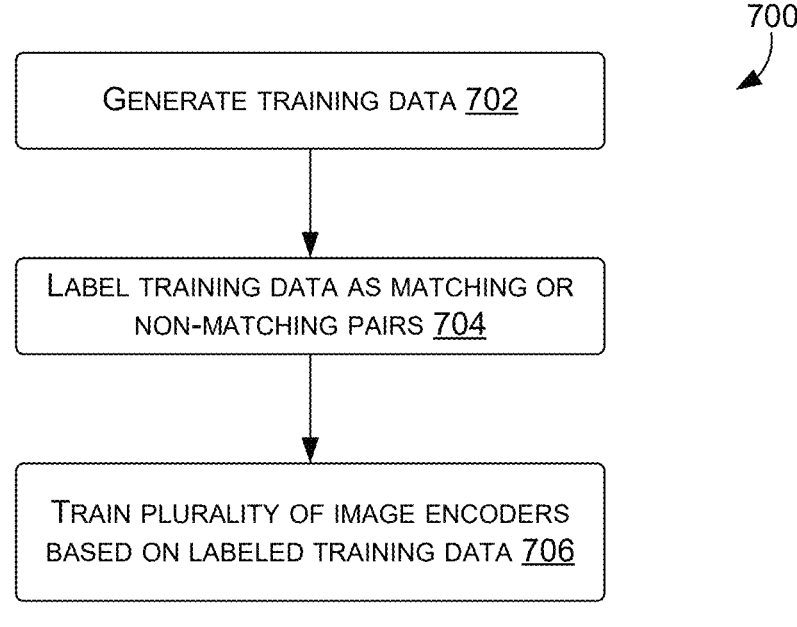
FIG. 7 depicts an example process flow for training a machine learning model to determine images with semantic meaning matching a query image, in accordance with at least one embodiment.

FIG. 7 is a flow diagram showing a method 700 for training an image encoder to identify images with matching semantic meaning in accordance with at least one embodiment. The method 700 can be performed, for instance, by the search tool 104 of FIG. 1. Each block of the method 700, 800, 900, 1000, and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 702, the system implementing the method 700 generates training data. As described above in connection with FIG. 1, in various embodiments, the training data includes data obtained from various sources such as the Internet or a repository. In some embodiments, the training data is synthetic data generated by a machine learning model. At block 704, the system implementing the method 700 labels the training data as matching or non-matching pairs. For example, the data is human-labeled. In other examples, a separate machine learning model is trained to label the training data. In various embodiments, the training data is labeled to indicate relative similarity. For example, generating training data for a triplet neural network as described above includes labeling a first image as more similar to an anchor image than a second image.

At block 706, the system implementing the method 700 trains a plurality of image encoders based on the labeled training data. In one example, a Siamese neural network or a triplet neural network is trained using a loss function. In various embodiments, training the image encoders includes causing the image encoders to perform inferencing on the training data and using a function (e.g., loss function, reward function, etc.) to modify weights of the image encoders.

Figure 8:
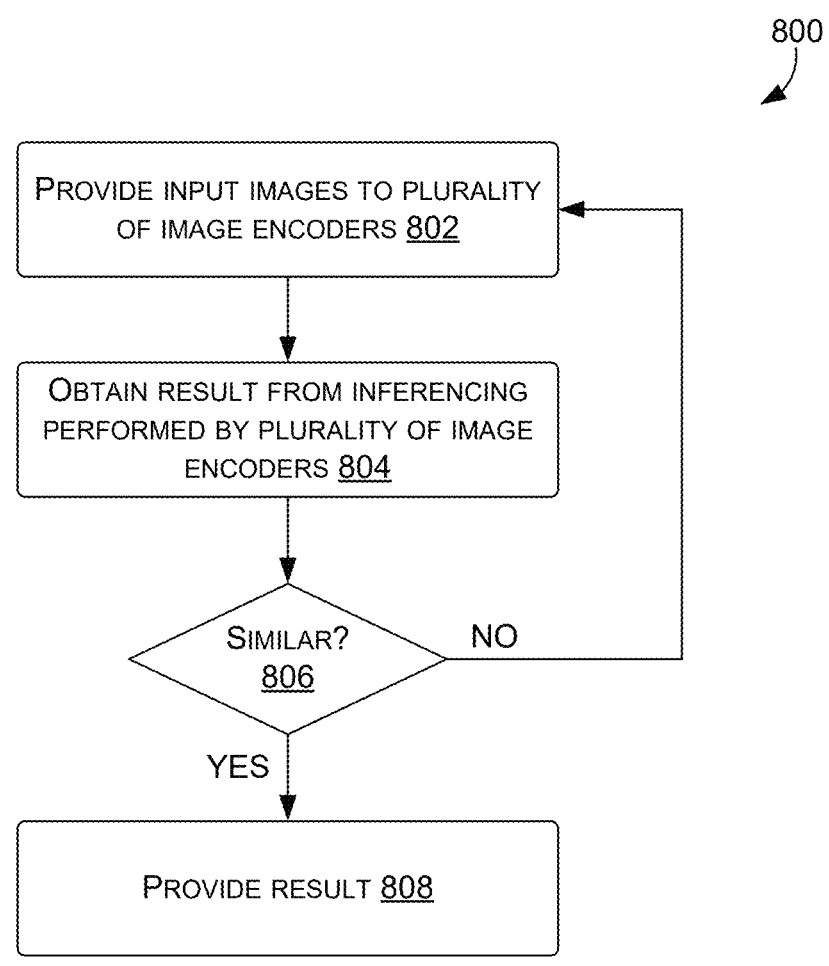
FIG. 8 depicts an example process flow for using a machine learning model to detect images with semantic meaning matching a query image, in accordance with at least one embodiment.

FIG. 8 depicts an example process flow for using a machine learning model to detect images with matching semantic meaning, in accordance with at least one embodiment. The method 800 can be performed, for instance, by the neural networks of FIGS. 2A and 2B. As shown at block 802, the system implementing the method 800 provides input images to a plurality of image encoders. In one example, a query image and a second image are provided to the plurality of image encoders such as a Siamese neural network trained to determine if the images contain the same or similar semantic information and/or meaning. In another example, a query image and two images are provided to the plurality of image encoders such as a triplet neural network trained to determine which image of the two images is more similar to the query image (e.g., which image contains the most similar semantic information).

At block 804, the system implementing the method 800 obtains results from inferencing performed by the plurality of image encoders. For example, the plurality of image encoders generate embeddings that represent the input images. In another example, the plurality of image encoders generate output in geometric markup as described above. At block 806, the system implementing the method 800 determines, based on the output of the plurality of image encoders, whether the images contain similar semantic meaning. If the image does not contain similar semantic meaning, the system implementing the method 800 returns to block 802 and continues to search for images with similar semantic meaning. If the image does contain similar semantic meaning, the system implementing the method 800 continues to block 808 and provides the result. For example, the image is provided to a service that generates a response for the user including a solution to a problem displayed in the query image. In various embodiments, the method 800 is repeated to identify additional images.

Figure 9:
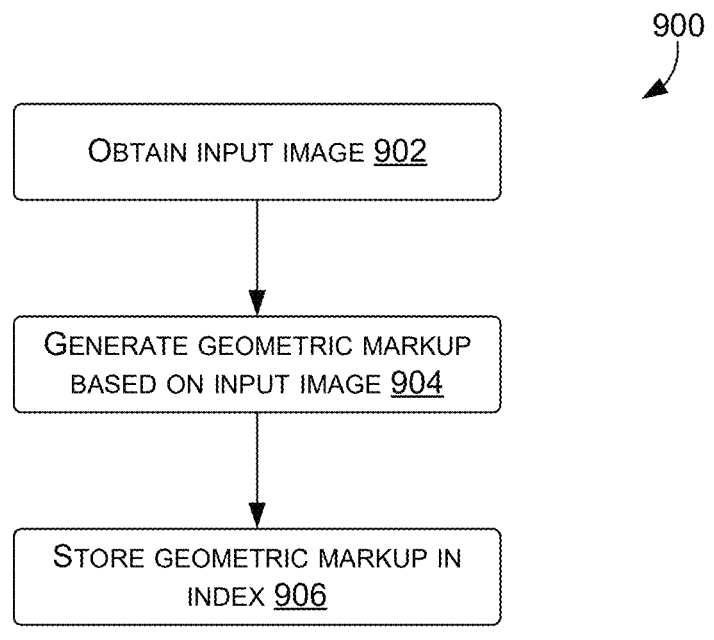
FIG. 9 depicts an example process flow for generating an index used to search for images with semantic meaning matching a query image, in accordance with at least one embodiment.

FIG. 9 depicts an example process flow for generating an index used to search for images with matching semantic meaning, in accordance with at least one embodiment. The method 900 can be performed, for instance, by the search tool 104 of FIG. 1. As shown at block 902, the system implementing the method 900 obtains an input image 902. For example, the input image includes a query image obtained through a user interface of an application as described above in connection with FIGS. 5 and 6. In another example, an input image includes an image included in a training dataset. The input image, in an embodiment, includes an image, video frame, or other visual representation that includes some semantic information and/or meaning such as a geometry problem, a match problem, blue prints, notes, diagrams, etc.

At block 904, the system implementing the method 900 generates geometric markup based on the input image. For example, a neural diagram parser generates relation sets and primitives based on the input image. At block 906, the system implementing the method 900 stores the geometric markup in an index. For example, the relation sets and primitives are indexed in a data structure in associating with the input image and/or other information suitable for generating a result when identifying images with matching semantic information.

Figure 10:
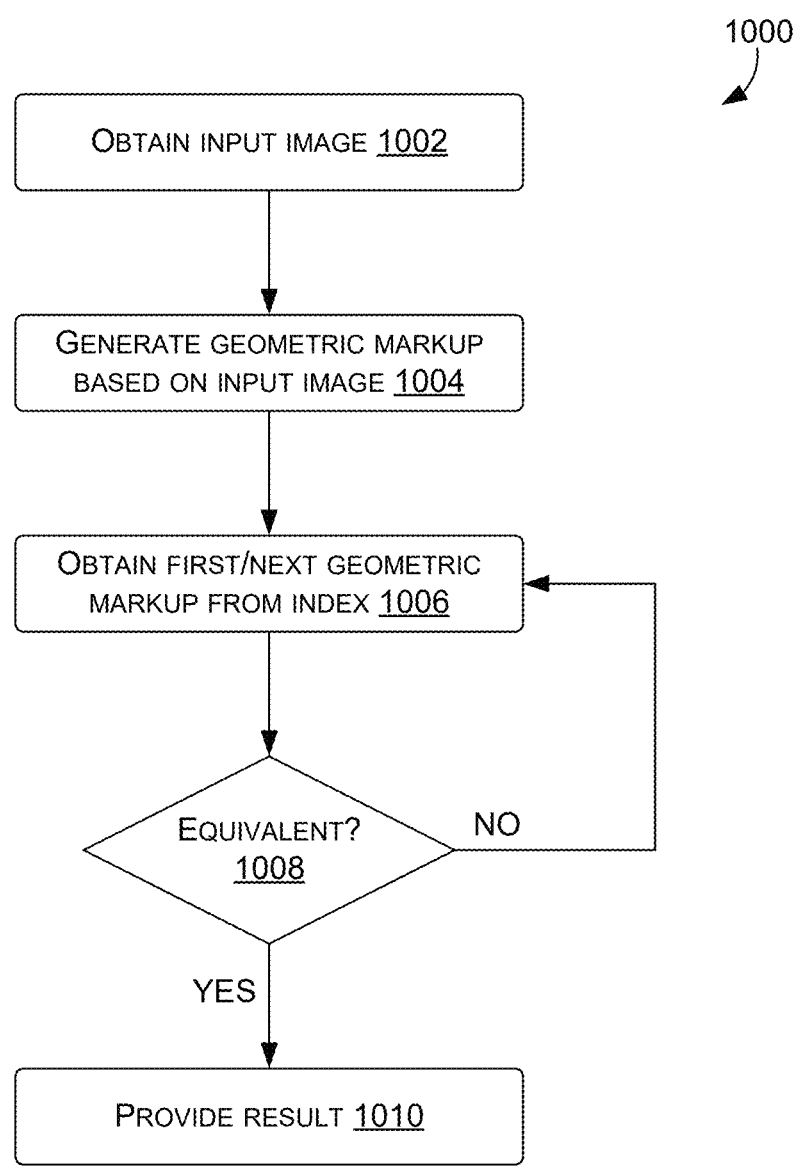
FIG. 10 depicts an example process flow for searching an index to identify images with semantic meaning matching a query image, in accordance with at least one embodiment.

FIG. 10 depicts an example process flow for searching an index to identify images with matching semantic meaning, in accordance with at least one embodiment. The method 1000 can be performed, for instance, by the search tool 104 of FIG. 1. As shown at block 1002, the system implementing the method 1000 obtains an input image. For example, the input image includes a query image obtained through a user interface of an application as described above in connection with FIGS. 5 and 6. In another example, an input image includes an image included in a training dataset. The input image, in an embodiment, includes an image, video frame, or other visual representation that includes some semantic information and/or meaning such as a geometry problem, a match problem, blue prints, notes, diagrams, etc.

At block 1004, the system implementing the method 1000 generates geometric markup based on the input image. For example, a neural diagram parser generates relation sets and primitives based on the input image. At block 1006, the system implementing the method 1000 obtains a first/next geometric markup from an index 1006. For example, as described above in connection with FIG. 4, the index is first filtered to identify images with similar sets of primitives and then filters the results based on the relation sets.

At block 1008, the system implementing the method 1000 determines if the geometric markup generated based on the input image is similar to the geometric markup obtained from the index. If the geometric markup is not similar, the system implementing the method 1000 returns to block 1006 and obtains the next geometric markup from the index. If the geometric markup is similar, the system implementing the method 1000 continues to block 1010 and provides the result. For example, identified matching images are provided to a service that generates a response for the user, including a solution to a problem displayed in the query image. In various embodiments, the method 1000 is repeated to identify additional images.

Figure 11:
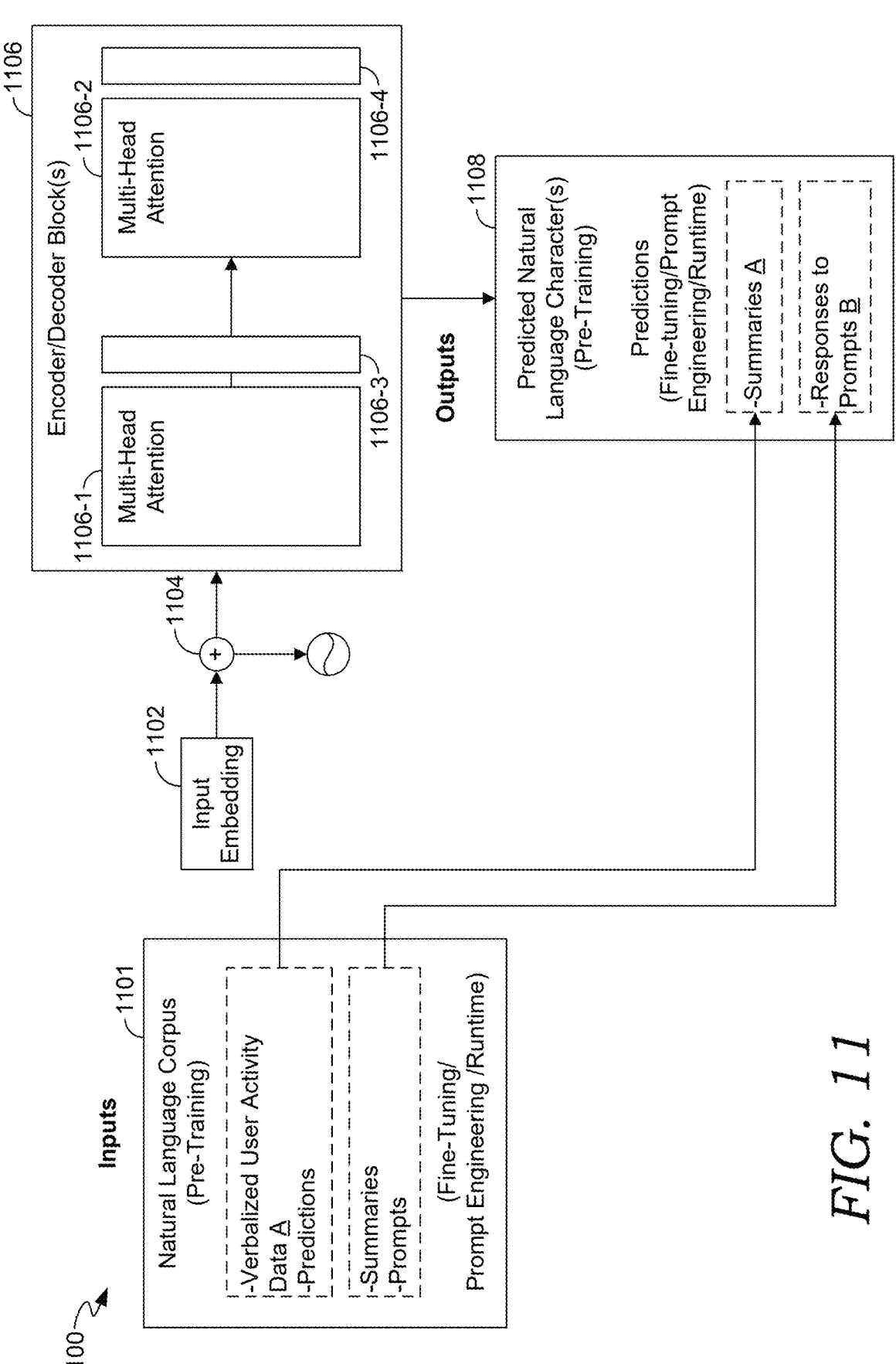
FIG. 11 is a block diagram of a Large Language Model that uses particular inputs to make particular predictions, according to some embodiments.

FIG. 11 is a block diagram of a Large Language Model 1100 (e.g., a BERT model or GPT-4 model) that uses particular inputs to make particular predictions (e.g., answers to questions), according to some embodiments. In some embodiments, this model 1100 represents or includes the functionality as described with respect to the search tool 104 of FIG. 1 and or the LLM 314 of FIG. 3B. In various embodiments, the language model 1100 includes one or more encoders and/or decoder blocks 1106 (or any transformer or portion thereof).

First, a natural language corpus (e.g., various WIKIPEDIA English words or BooksCorpus) of the inputs 1101 are converted into tokens and then feature vectors and embedded into an input embedding 1102 to derive meaning of individual natural language words (for example, English semantics) during pre-training. In some embodiments, to understand English language, corpus documents, such as text books, periodicals, blogs, social media feeds, and the like are ingested by the language model 1100.

In some embodiments, each word or character in the input(s) 1101 is mapped into the input embedding 1102 in parallel or at the same time, unlike existing long short-term memory (LSTM) models, for example. The input embedding 1102 maps a word to a feature vector representing the word. But the same word (for example, "apple") in different sentences may have different meanings (for example, phone versus fruit). This is why a positional encoder 1104 can be implemented. A positional encoder 1104 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sine/cosine function to generate the positional encoder vector as follows:

$$PE_{(pos,2i)} = \sin\left(pos/10000^{2i/d_{model}}\right)$$

$$PE_{(pos,2i+1)} = \cos\left(pos/10000^{2i/d_{model}}\right)$$

After passing the input(s) 1101 through the input embedding 1102 and applying the positional encoder 1104, the output is a word embedding feature vector, which encodes positional information or context based on the positional encoder 1104. These word embedding feature vectors are then passed to the encoder and/or decoder block(s) 1106, where it goes through a multi-head attention layer 1106-1 and a feedforward layer 1106-2. The multi-head attention layer 1106-1 is generally responsible for focusing or processing certain parts of the feature vectors representing specific portions of the input(s) 1101 by generating attention vectors. For example, in question-answering systems, the multi-head attention layer 1106-1 determines how relevant the $i^{th}$ word (or particular word in a sentence) is for answering the question, or the relevance to other words in the same or other blocks, the output of which is an attention vector. For every word, some embodiments generate an attention vector, which captures contextual relationships between other words in the same sentence or another sequence of characters. For a given word, some embodiments compute a weighted average or otherwise aggregate attention vectors of other words that contain the given word (for example, other words in the same line or block) to compute a final attention vector.

In some embodiments, a single-headed attention layer has abstract vectors Q, K, and V that extract different components of a particular word. These are used to compute the attention vectors for every word, using the following formula:

$$Z = softmax\left(\frac{Q \cdot K^T}{\sqrt{\text{Dimension of vector } Q, K \text{ or } V}}\right) \cdot V$$

For multi-headed attention, there are multiple weight matrices $W^q$, $W^k$ and W so there are multiple attention vectors Z for every word. However, a neural network may only expect one attention vector per word. Accordingly, another weighted matrix, $W^z$, is used to make sure the output is still an attention vector per word. In some embodiments, after the layers 1106-1 and 1106-2, there is some form of normalization (for example, batch normalization and/or layer normalization) performed to smoothen out the loss surface, making it easier to optimize while using larger learning rates.

Layers 1106-3 and 1106-4 represent residual connection and/or normalization layers where normalization re-centers and re-scales or normalizes the data across the feature dimensions. The feedforward layer 1106-2 is a feed forward neural network that is applied to every one of the attention vectors outputted by the multi-head attention layer 1106-1. The feedforward layer 1106-2 transforms the attention vectors into a form that can be processed by the next encoder block or for making a prediction at 1108. For example, given that a document includes a first natural language sequence "the due date is . . . " the encoder/decoder block(s) 1106 predicts that the next natural language sequence will be a specific date or particular words based on past documents that include language identical or similar to the first natural language sequence.

In some embodiments, the encoder/decoder block(s) 1106 includes pre-training to learn language and make corresponding predictions. In some embodiments, there is no fine-tuning because some embodiments perform prompt engineering, prompt-tuning, or zero-shot learning. "Prompt engineering" refers to a process of designing or using structured input to the model (referred to as a prompt or prompts) to cause a desired response to be generated by the model. In some embodiments, prompt engineering includes creating the best or optimal prompt, or series of prompts, for the desired user task or output. Accordingly, given a first prompt (which may include target content), if the model produces a first output with a high likelihood of not being the correct response, particular embodiments learn such that a second output (indicative of high likelihood of being a correct response) is always produced when such a first prompt is provided as input. In this way, at model deployment time, no output is ever produced with a low likelihood of being the correct response if the first prompt (or variation thereof) is provided, thereby increasing the accuracy of the model's generative outputs.

Pre-training is performed to understand language and fine-tuning is performed to learn a specific task, such as learning an answer to a set of questions (in Question Answering systems). In some embodiments, the encoder/decoder block(s) 1106 learns what language and context for a word is in pre-training by training on two unsupervised tasks (MLM and NSP) simultaneously or at the same time. In terms of the inputs and outputs, at pre-training, the natural language corpus of the inputs 1101 may be various historical documents, such as text books, journals, and periodicals, in order to output the predicted natural language characters in 1108 (not make the predictions at runtime or prompt engineering at this point). The encoder/decoder block(s) 1106 takes in a sentence, paragraph, or sequence (for example, included in the input[s]1101), with random words being replaced with masks. The goal is to output the value or meaning of the masked tokens. For example, if a line reads, "please [MASK] this document promptly," the prediction for the "mask" value is "send." This helps the encoder/decoder block(s) 1106 understand the bidirectional context in a sentence, paragraph, or line at a document. In the case of NSP, the encoder/decoder block(s) 1106 takes, as input, two or more elements, such as sentences, lines, or paragraphs, and determines, for example, if a second sentence in a document actually follows (for example, is directly below) a first sentence in the document. This helps the encoder/decoder block(s) 1106 understand the context across all the elements of a document, not just within a single element. Using both of these together, the encoder/decoder block(s) 1106 derives a good understanding of natural language.

In some embodiments, during pre-training, the input to the encoder/decoder block(s) 1106 is a set (for example, 2) of masked sentences (sentences for which there are one or more masks), which could alternatively be partial strings or paragraphs. In some embodiments, each word is represented as a token, and some of the tokens are masked. Each token is then converted into a word embedding (for example, 1102). At the output side is the binary output for the next sentence prediction. For example, this component may output 1, for example, if masked sentence 2 followed (for example, was directly beneath) masked sentence 1. The output is word feature vectors that correspond to the outputs for the machine learning model functionality. Thus, the number of word feature vectors that are input is the same number of word feature vectors that are output.

In some embodiments, the initial embedding (for example, the input embedding 1102) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence number (that includes the input[s]1101) that is encoded into a vector (for example, first sentence, second sentence, etc., assuming a top-down and right-to-left approach). The position embeddings are vectors that represent the position of a particular word in such sentence that can be produced by positional encoder 1104. When these three embeddings are added or concatenated together, an embedding vector is generated that is used as input into the encoder/decoder block(s) 1106. The segment and position embeddings are used for temporal ordering since all of the vectors are fed into the encoder/decoder block(s) 1106 simultaneously, and language models need some sort of order preserved.

In pre-training, the output is typically a binary value C (for NSP) and various word vectors (for MLM). With training, a loss (for example, cross-entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, once pre-training is performed, the encoder/decoder block(s) 1106 performs prompt engineering or fine-tuning on a variety of data sets by converting different formats into a unified sequence-to-sequence format. For example, some embodiments perform the task by adding a new question-answering head or encoder/decoder block, just the way a masked language model head is added (in pre-training) for performing an MLM task, except that the task is a part of prompt engineering or fine-tuning. This includes the encoder/decoder block(s) 1106 processing the inputs 1101 (i.e., the verbalized user activity data, the predictions, summaries, and/or prompts) in order to make the predictions and confidence scores as indicated in 1108. Prompt engineering, in some embodiments, is the process of crafting and optimizing text prompts for language models to achieve desired outputs. In other words, prompt engineering is the process of mapping prompts (e.g., a question) to the output (e.g., an answer) that it belongs to for training. For example, if a user asks a model to generate a poem about a person fishing on a lake, the expectation is it will generate a different poem each time. Users may then label the output or answers from best to worst. Such labels are an input to the model to make sure the model is giving more human-like or best answers, while trying to minimize the worst answers (e.g., via reinforcement learning). In some embodiments, a "prompt" as described herein includes one or more of: a request (e.g., a question or instruction [e.g., write a poem]), target content, a command or instruction, and/or or more examples (e.g., one-shot or two-shot examples).

In an illustrative example, in some embodiments, the predictions of the output 1108 may be generative text, comparison, search results, or other visualizations, such as those described above. Alternative to prompt engineering or fine-tuning, in some embodiments the inputs 1101 and outputs 1108 represent "runtime" inputs and outputs. Runtime represents a time after which the model 1100 has been trained (e.g., via pre-training and/or fine-tuning and/or prompt engineering), tested, and deployed.

An artificial intelligence (AI) system refers to an artificial intelligence computing environment or architecture that includes the infrastructure and components that support the development, training, and deployment of artificial intelligence models. It provides necessary hardware, software, and frameworks for developers to create and run artificial intelligence applications. An artificial intelligence system may be a cloud-based AI solution that leverages cloud computing infrastructure to develop, train, deploy, and manage AI models and applications. AI models may specifically refer to generative AI models that are designed to generate new data or content that is similar to, or in some cases, entirely different from data they are trained on.

Artificial intelligence systems can include transformer models that are capable of running complex neural language processing tasks. Transformer models, such as language models, have applications in a wide range of industries. Once such language model is a Large Language Models (LLM). An LLM is a trained deep learning model that can recognize, summarize, translate, predict, and generate content using very large datasets. LLMs and other types of generative AI models are associated with a training phase—where a model is taught to learn patterns, relationships, and knowledge from training datasets—and an inference phase, which includes making predictions, classifications, or generating outputs for real-world tasks or queries. Various embodiments described in the present disclosure use LLMs to perform various operations, these operations can, in other embodiments, be performed using other generative AI models include medium language models (MLMs) and small language models (SLMs). In various embodiments, a language model includes an LLM, MLM, and/or SLM.

Unlike convolution neural networks, which are typically used for image tasks and mostly rely on convolution operations, transformer models are based on simple general matrix multiplication (GEMM) tasks, which can be further broken down to perform a dot product operation on two vectors. While CNN architectures are typically computationally heavy with a relatively small number of parameters, the architecture of transformer models results in the opposite: a very large number of parameters, with a fairly small number of operations. The LLM architecture can create challenges in that performance bottlenecks reside in the memory throughput and capacity rather than the compute engine.

Transformer models operate with memory accesses to retrieve a matrix of weights out of memory, together with a vector (either the input vector or partial result from a previous stage of the model), and multiplying the two. This is true for the model's attention sublayers, the FFN (feed forward network), sublayers, and for the final embedding layer. As vector-matrix multiplication is actually comprised of numerous vector-vector multiplications (dot product), it is fair to say that most memory accesses are used to read two vectors in order to perform a dot product on them. As such, reading out the full vectors is inefficient.

As such, transformer models (also referred to herein as "generative AI models") require computational resources including processors and memory for the training phase and inference phase. The generative AI models operate with different types of processors (e.g., central processing units [CPUs] or graphics processing unit [GPUs]) in architectures that include multi-core CPUs or parallel processors including GPUs and tensor processing units (TPUs). Memory can be used to store model parameters and intermediate data for the training phase and the inference phase. Memory requirements may depend on the size and the architecture of the generative AI models. By way of illustration, an LLM can support an inferencing phase that includes using a trained model to make predictions, draw conclusions, or generate output based on input data or patterns learned during the model's training phase. During the inference phase, an LLM can use DRAM (Dynamic Random-Access Memory) to store various components and data for making inferences. LLMs can store their pre-trained model parameters (e.g., weights and biases of the neural network layers) in DRAM, and when a new input is provided for inference, the model accesses these parameters from DRAM to make predictions.

The inference phase can be divided into two stages: a prompt stage and an auto-regressive stage. The prompt stage can include receiving and processing input as a batch of new tokens as part of the same inference. The prompt stage may operate based on a Key-Value (KV) cache technique, where a KV cache is created for tokens in a batch. During the prompt stage, the input is being digested. The auto-regressive state can include using the model to generate the tokens one by one, based on previous tokens, relying on reading the KV cache of previously processed tokens, and adding the data of only new tokens to the KV cache. This auto-regressive stage includes the model generating a response to the input from the prompt stage.

OTHER EMBODIMENTS

In some embodiments, a computer-implemented method is provided. The method includes obtaining a query image through a user interface of an application, the query image including semantic information and depicting a problem associated with the semantic information. The method may further include causing an object detector to extract a set of primitives from the query image. The method may further include causing a neural diagram parser to extract a relation set from the query image based on the set of primitives. The method may further include filtering an index based on the set of primitives and the relation set to identify a set of images with similar semantic information as the query image, where the index stores primitives and relation sets corresponding to images of a set of images. The method may further include determining an image of the set of images that matches the query image based on a comparison of the set of primitives and the relation set and a second set of primitives and a second relation set corresponding to the image. The method may further include providing an indication of the image in response to the query. In this way, these and other embodiments of this disclosure enable an improved user experience when performing an image search.

In any combination of the above embodiments of the computer-implemented method, the method further comprises generating the index by at least causing the object detector and the neural diagram parser to generate the primitives and the relation sets based on the set of images.

In any combination of the above embodiments of the computer-implemented method, the set of images are obtained from the Internet.

In any combination of the above embodiments of the computer-implemented method, the set of images are obtained from a training dataset including human-labeled images.

In any combination of the above embodiments of the computer-implemented method, identifying the image of the set of images that matches the query image further comprises causing a language model to determine that the image matches the query image based on a prompt including at least: the set of primitives and the relation set; and the second set of primitives and the second relation set.

In any combination of the above embodiments of the computer-implemented method, the large language model is fine-tuned based on the primitives and the relation sets corresponding to the images of the set of images stored in the index.

In any combination of the above embodiments of the computer-implemented method, identifying the image of the set of images that matches the query image further comprises comparing the set of primitives and the relation set and the second set of primitives and the second relation set based on fuzzy logic.

In some embodiments, a computer-readable media storing executable instructions embodied thereon, that, as a result of being executed by a processing device, cause the processing device to perform operations. The operations comprise obtaining a first image including first semantic information and a second image including second semantic information. The operations may further comprise generating a determination that the first semantic information matches the second semantic information by at least causing a first image encoder to perform a first inferencing operation taking as an input the first image and a second image encoder to perform a second inferencing operation taking as an input the second image. The operations may further comprise providing the determination to an application in response to a query including the first image.

In any combination of the above embodiments of the media, the operations may further comprise causing a set of embeddings generated by the first image encoder and the second image encoder based on a set of images to be stored in an index and generating the determination that the first semantic information matches the second semantic information further comprises searching the index.

In any combination of the above embodiments of the media, the operations may further comprise searching in the index further comprises performing an approximate nearest neighbor search.

In any combination of the above embodiments of the media, the operations may further comprise the set of images are obtained from a training dataset including human-labeled images.

In any combination of the above embodiments of the media, the operations may further comprise the first image encoder and the second image encoder further comprise a Siamese neural network.

In any combination of the above embodiments of the media, the operations may further comprise generating the determination that the first semantic information matches the second semantic information further comprises causing a third image encoder to perform a third inferencing operation taking as an input a third image including third semantic information, where the determination indicates that the first semantic information is more similar to the second semantic information than the third semantic information.

In any combination of the above embodiments of the media, the operations may further comprise the first image encoder, the second image encoder, and the third image encoder further comprise a triplet neural network.

In any combination of the above embodiments of the media, the operations may further comprise wherein the second image further comprises a key frame extracted from a video.

In some embodiments, a system comprising a memory component and a processing device coupled to the memory component, the processing device to perform operations.

The operations comprise, obtaining a query image including first semantic information. The operations may further comprise generating a first geometric markup associated with the query image including at least a set of primitives and a relation set indicating relationships between primitives of the set of primitives by at least: causing an object detector to generate the set of primitives based on the query image; and causing a neural diagram parser to generate the relation set based on the query image and the set of primitives. The operations may further comprise identifying an image with second semantic information similar to the first semantic information based on a second geometric markup associated with the image. The operations may further comprise generating a determination that the first semantic information matches the second semantic information by at least comparing the first geometric markup with the second geometric markup.

In any combination of the above embodiments of the system, the operations further comprise the first semantic information further comprises a geometry problem and the generating the determination further comprises determining the second semantic information also includes the geometry problem.

In any combination of the above embodiments of the system, the operations further comprise generating the first geometric markup further comprises generating a set of predicates based on the query image and the geometry problem.

In any combination of the above embodiments of the system, the operations further comprise obtaining the query image further comprises obtaining a natural language query associated with the query image.

In any combination of the above embodiments of the system, the operations further comprise identifying the image with the second semantic information further comprises filtering an index storing a set of geometric markups associated with images.

Example Computing Environments

Figure 12:
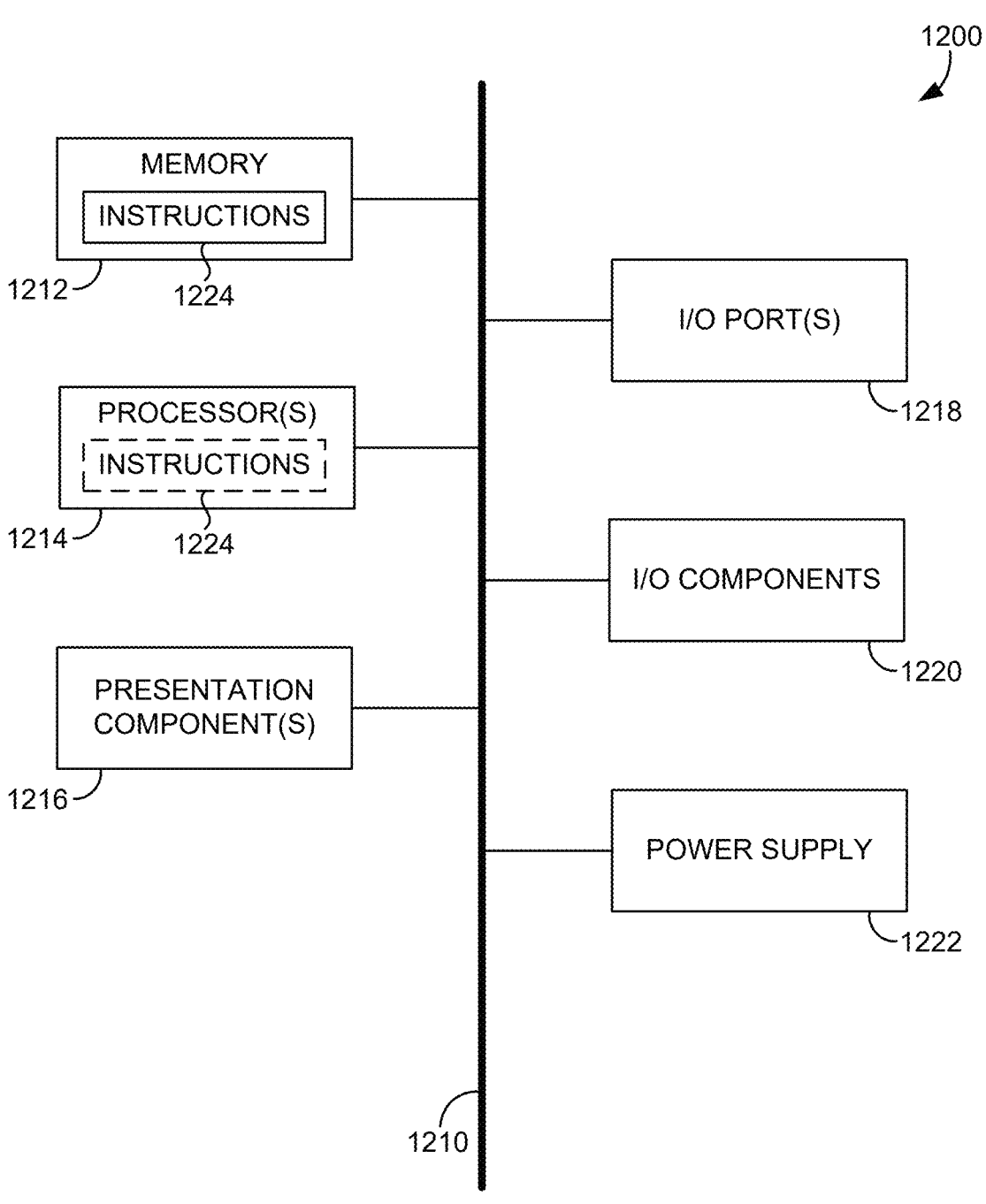
FIG. 12 is a block diagram of an exemplary computing environment suitable for use in implementations of the present disclosure.

Having described embodiments of the present disclosure, FIG. 12 provides an example of a computing device in which embodiments of the present disclosure may be employed. Computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more buses (such as an address bus, data bus, or combination thereof). Although the various blocks of FIG. 12 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 12 is merely illustrative of an exemplary computing device that can be used in connection with one or more embodiments of the present technology. Distinction is not made between such categories as "workstation," "server," "laptop," "handheld device," etc., as all are contemplated within the scope of FIG. 12 and make reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, digital versatile disks (DVDs) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, infrared, and other wireless media. Combinations of any of the above should also be included within the scope of computer-readable media.

Memory 1212 includes computer storage media in the form of volatile and/or nonvolatile memory. As depicted, memory 1212 includes instructions 1224. Instructions 1224, when executed by processor(s) 1214, are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built-in. Illustrative components include a microphone, joystick, game pad, satellite dish, scanner, printer, wireless device, etc. I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1200. Computing device 1200 may be equipped with depth cameras, such as stereoscopic camera systems, infrared camera systems, camera systems, and combinations of these, for gesture detection and recognition. Additionally, computing device 1200 may be equipped with accelerometers or gyroscopes that enable detection of motion. The output of the accelerometers or gyroscopes may be provided to the display of computing device 1200 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order to not obscure the illustrative embodiments.

Various operations have been described as multiple discrete operations, in turn, in a manner that is most helpful in understanding the illustrative embodiments; however, the order of descriptions should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)".

What is claimed is:

1. A method comprising:
obtaining a query image through a user interface of an application, the query image including semantic information and depicting a problem associated with the semantic information;
causing an object detector to extract a set of primitives from the query image;
causing a neural diagram parser to extract a relation set from the query image based on the set of primitives;
filtering an index based on the set of primitives and the relation set to identify a set of images with similar semantic information as the query image, where the index stores primitives and relation sets corresponding to images of a set of images;
determining an image of the set of images that matches the query image based on a comparison of the set of primitives and the relation set and a second set of primitives and a second relation set corresponding to the image; and
and providing an indication of the image in response to the query.

2. The method of claim 1, wherein the method further comprises generating the index by at least causing the object detector and the neural diagram parser to generate the primitives and the relation sets based on the set of images.

3. The method of claim 1, wherein the set of images are obtained from the Internet.

4. The method of claim 1, wherein the set of images are obtained from a training dataset including human-labeled images.

5. The method of claim 1, wherein identifying the image of the set of images that matches the query image further comprises causing a language model to determine that the image matches the query image based on a prompt including at least:
the set of primitives and the relation set; and
the second set of primitives and the second relation set.

6. The method of claim 5, wherein the large language model is fine-tuned based on the primitives and the relation sets corresponding to the images of the set of images stored in the index.

7. The method of claim 1, wherein identifying the image of the set of images that matches the query image further comprises comparing the set of primitives and the relation set and the second set of primitives and the second relation set based on fuzzy logic.

8. Computer-readable media storing executable instructions embodied thereon, that, as a result of being executed by a processing device, cause the processing device to perform operations comprising:
obtaining a first image including first semantic information and a second image including second semantic information;
generating a determination that the first semantic information matches the second semantic information by at least causing a first image encoder to perform a first inferencing operation taking as an input the first image and a second image encoder to perform a second inferencing operation taking as an input the second image; and
providing the determination to an application in response to a query including the first image.

9. The media of claim 8, wherein the operations further comprise:
causing a set of embeddings generated by the first image encoder and the second image encoder based on a set of images to be stored in an index; and
wherein generating the determination that the first semantic information matches the second semantic information further comprises searching the index.

10. The media of claim 9, wherein searching in the index further comprises performing an approximate nearest neighbor search.

11. The media of claim 9, wherein the set of images are obtained from a training dataset including human-labeled images.

12. The media of claim 8, wherein the first image encoder and the second image encoder further comprise a Siamese neural network.

13. The media of claim 8, wherein generating the determination that the first semantic information matches the second semantic information further comprises causing a third image encoder to perform a third inferencing operation taking as an input a third image including third semantic information, where the determination indicates that the first semantic information is more similar to the second semantic information than the third semantic information.

14. The media of claim 13, wherein the first image encoder, the second image encoder, and the third image encoder further comprise a triplet neural network.

15. The media of claim 8, wherein the second image further comprises a key frame extracted from a video.

16. A system comprising:

a memory component; and a processing device coupled to the memory component, the processing device to perform operations comprising:

obtaining a query image including first semantic information;

generating a first geometric markup associated with the query image including at least a set of primitives and a relation set indicating relationships between primitives of the set of primitives by at least:

causing an object detector to generate the set of primitives based on the query image; and causing a neural diagram parser to generate the relation set based on the query image and the set of primitives;

identifying an image with second semantic information similar to the first semantic information based on a second geometric markup associated with the image; and generating a determination that the first semantic information matches the second semantic information by at least comparing the first geometric markup with the second geometric markup.

17. The system of claim 16, wherein the first semantic information further comprises a geometry problem; and wherein the generating the determination further comprises determining the second semantic information also includes the geometry problem.

18. The system of claim 17, wherein generating the first geometric markup further comprises generating a set of predicates based on the query image and the geometry problem.

19. The system of claim 16, wherein obtaining the query image further comprises obtaining a natural language query associated with the query image.

20. The system of claim 16, wherein identifying the image with the second semantic information further comprises filtering an index storing a set of geometric markups associated with images.

* * * * *